United States Patent
Yeung et al.

(10) Patent No.: US 6,838,514 B2
(45) Date of Patent: Jan. 4, 2005

(54) POLYMERS WHICH EXHIBIT THERMOTHICKENING PROPERTIES AND PROCESS MAKING SAME

(75) Inventors: Dominic Wai Kwing Yeung, Mississauga (CA); Leo Zhaoqing Liu, Mississauga (CA); Bruno RC Langlois, Sainte Genevieve des Bois (FR); Dominique Charmot, Le Pre Saint Gervais (FR); Pascale Corpart, Sannois (FR)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 10/410,637

(22) Filed: Apr. 9, 2003

(65) Prior Publication Data

US 2003/0204014 A1 Oct. 30, 2003

Related U.S. Application Data

(62) Division of application No. 09/457,781, filed on Dec. 9, 1999, now abandoned.
(60) Provisional application No. 60/112,306, filed on Dec. 14, 1998.

(51) Int. Cl.[7] .......................... C08F 2/32; C08F 216/12
(52) U.S. Cl. .................. 524/801; 526/307.5; 526/320; 526/333
(58) Field of Search ................. 524/801; 526/307.5, 526/320, 333

(56) References Cited

U.S. PATENT DOCUMENTS

| | | | |
|---|---|---|---|
| 3,284,393 A | | 11/1966 | Vanderhoff et al. ......... 260/29.6 |
| 4,268,641 A | * | 5/1981 | Koenig et al. .............. 525/367 |
| 4,351,754 A | * | 9/1982 | Dupre ........................ 524/445 |
| 4,384,096 A | * | 5/1983 | Sonnabend .................. 526/313 |
| 4,421,902 A | * | 12/1983 | Chang et al. ................. 424/49 |
| 4,616,074 A | * | 10/1986 | Ruffner ...................... 526/318 |
| 4,722,962 A | | 2/1988 | Shay et al. .................. 524/548 |
| 4,792,343 A | | 12/1988 | Hawe et al. ................... 44/51 |
| 4,873,086 A | | 10/1989 | Good et al. .................. 424/409 |
| RE33,156 E | * | 1/1990 | Shay et al. .................. 524/301 |
| 4,892,916 A | | 1/1990 | Hawe et al. .................. 526/304 |
| 5,294,692 A | * | 3/1994 | Barron et al. ................ 526/301 |
| 5,478,602 A | | 12/1995 | Shay et al. .................. 427/389 |
| 5,681,882 A | | 10/1997 | Jenkins et al. ............... 524/388 |

FOREIGN PATENT DOCUMENTS

| | | | |
|---|---|---|---|
| CA | 1304185 | 6/1992 | .......... C09J/133/06 |
| WO | WO 97/00275 | 1/1997 | |
| WO | WO 98/51694 | 11/1998 | |

OTHER PUBLICATIONS

Association and Thermal Gelation In Mixtures of Hydrophobically Modified Polyelectrolytes and Nonionic Surfactants, Anne Sarrazin–Cartalas et al., Langmuir, vol. 10, No. 5, 1994, pp. 1421–1426.

Reversible Thermothickening of Aqueous Polymer Solutions, D. Hourdet et al., Polymer, vol. 35, No. 12, 1994, pp. 2624–2630.

Aspects of Crosslinking Sulfonated Polyacrylamides From Rheological Studies on Their Gel, Sigale et al., CCC 0021–8995/97/061067–06, 1996, pp. 1067–1072.

Reversible Thermal Gelation in Polymer/Surfactant Systems. Control of The Gelation Temperature, Loyen et al., Langmuir, vol. 11, No. 4, 1995, pp. 1053–1056.

On The Thermal Gelling of Ethy;(Hydroxyethyl)Cellulose and Sodium Dodecyl Sulfate. Phase Behavior and Temperature Scanning Calorimetric Response, Wang et al., Macromolecules, vol. 30, No. 1, 1997, pp. 105–112.

\* cited by examiner

*Primary Examiner*—Kelechi C. Egwim
(74) *Attorney, Agent, or Firm*—Dilworth & Barrese, LLP

(57) ABSTRACT

A polymer produced by polymerizing via water-in-oil emulsion polymerization one or more water soluble monomers with one or more polyalkoxylated monomers wherein said one or more polyalkoxylated monomers contains at least 25 alkylene oxide units and wherein said product demonstrates thermothickening properties, its method of manufacture and use thereof is disclosed.

2 Claims, 7 Drawing Sheets

Figure 1. Salt Thickening of the Polymer from Example #10 (1%)
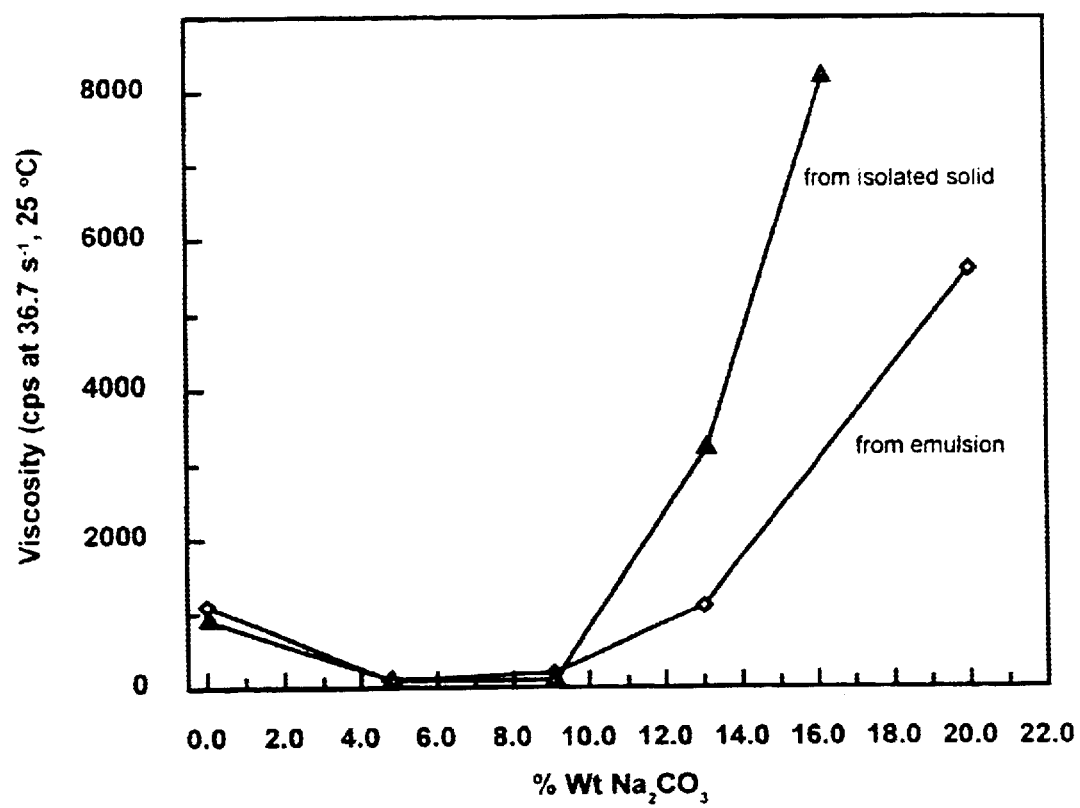

Figure 2. Thermal Thickening of the Polymer from Example #1 in Water or in 15% $Na_2CO_3$
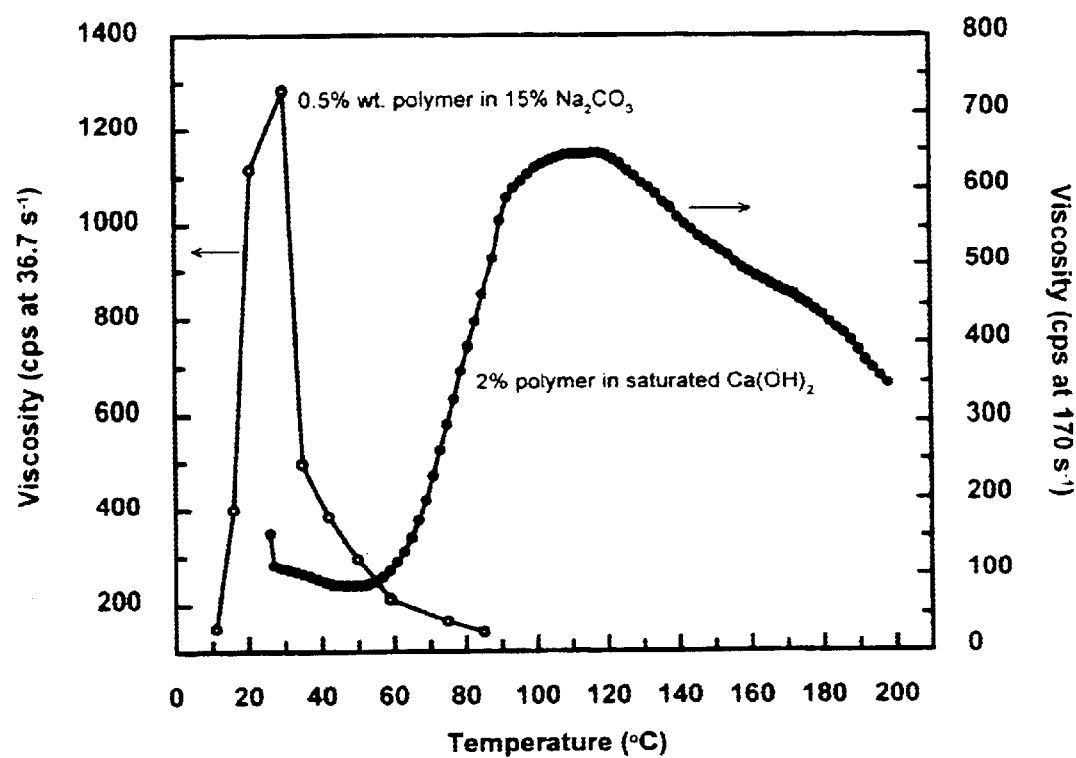

Figure 3. Thermal Thickening of the Polymer from Example #10 in Saturated $Ca(OH)_2$ or in the Presence of 15% (by Weight) Sodium Carbonate.
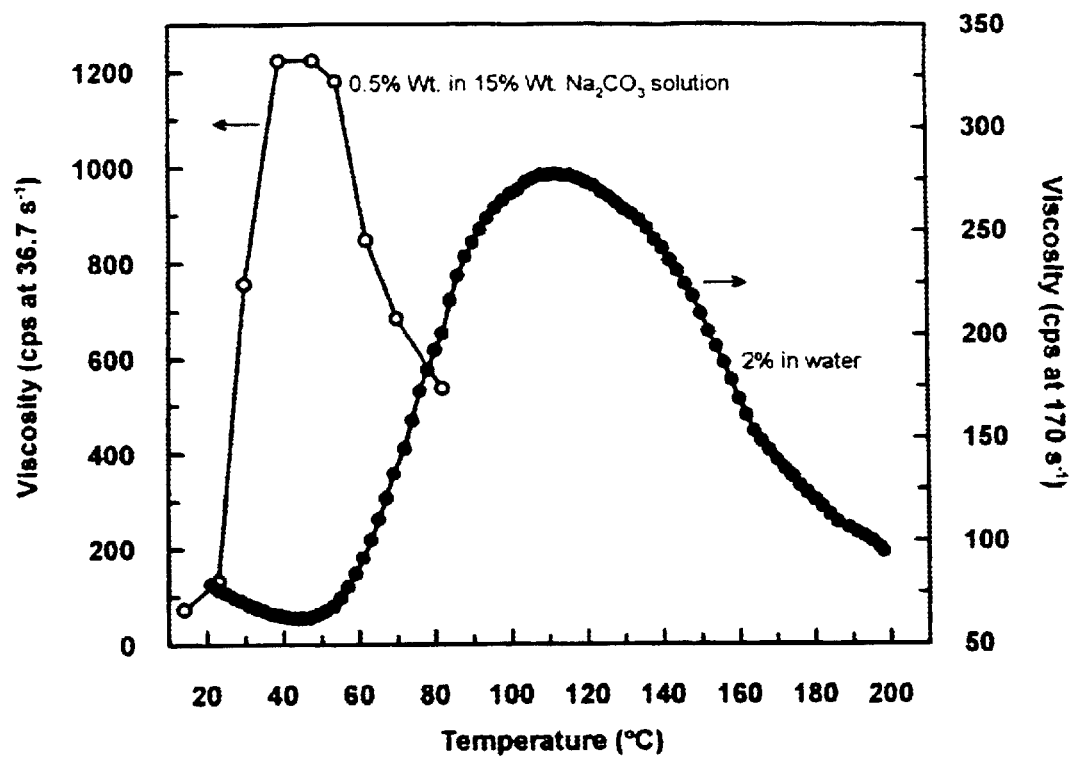

Figure 4. Thermal Thickening of the Polymer from Example #10 (1.0%) in the Presence of 15% (by Weight) $Na_2CO_3$ ( Prepared Directly from Emulsion or from the Precipitated Solid)
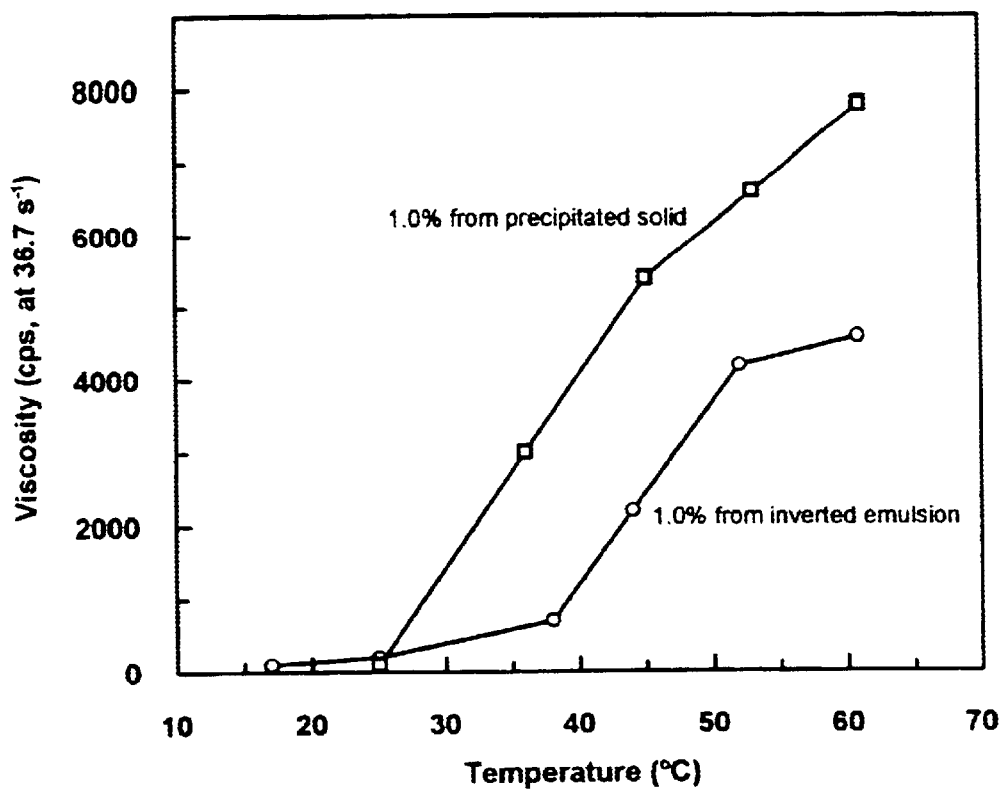

Figure 5. Shear Thickening of 1% Polymer from Example #10 (Precipitated Solid) in the Presence of 20% (by Weight) Sodium Carbonate.
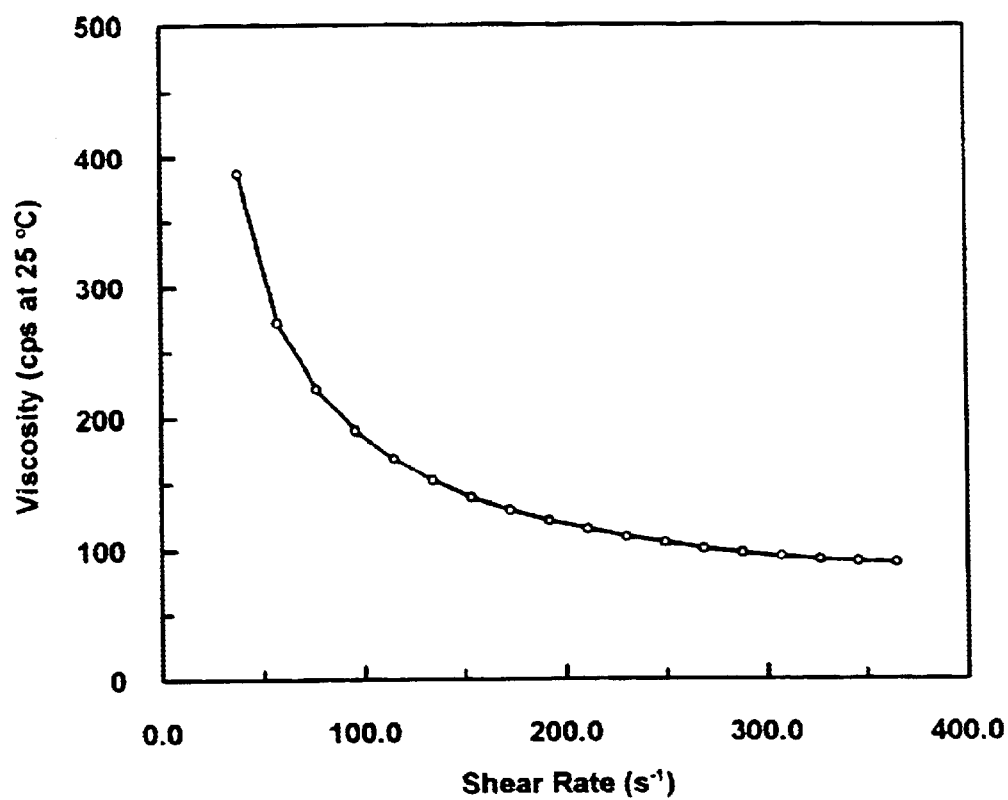

Figure 6. Thermal Thickening of Polymer from Examples #3-6 and #1 (0.5% by weight) in the Presence of 15% (by Weight) $Na_2CO_3$ ( Prepared from the Precipitated Solid with NaOH)
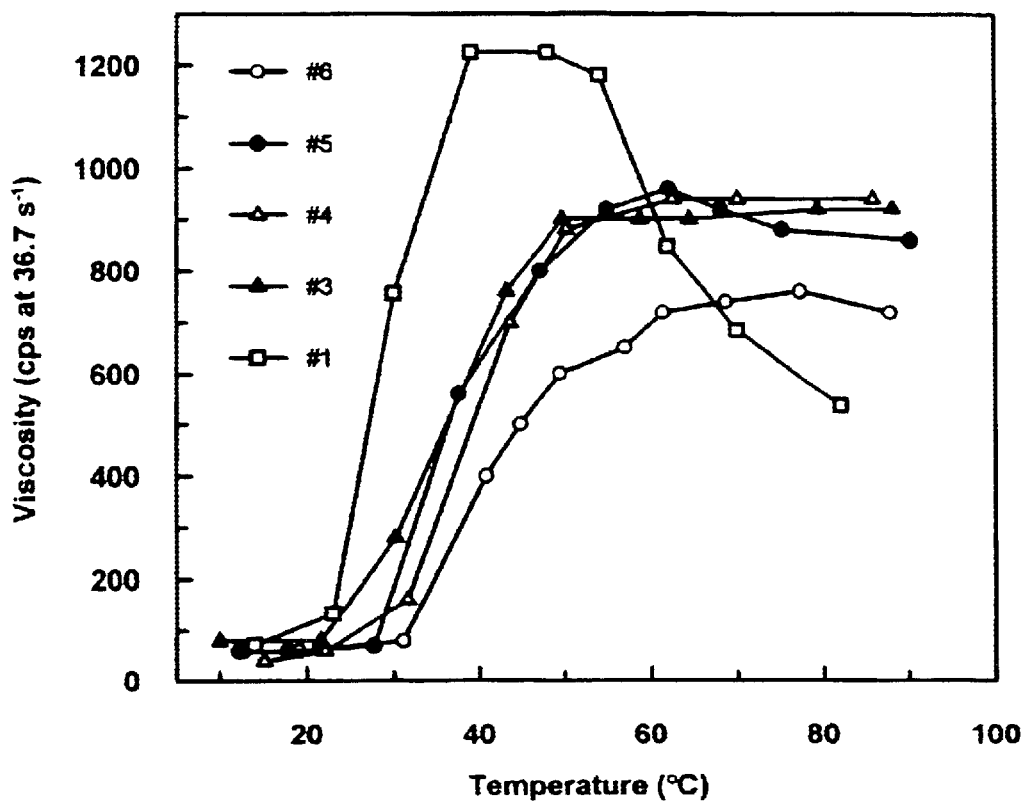

Figure 7. The Enhancement of Thermal Thickening of Polymer from # 32 in the Presence of Rhodasurf LA-7
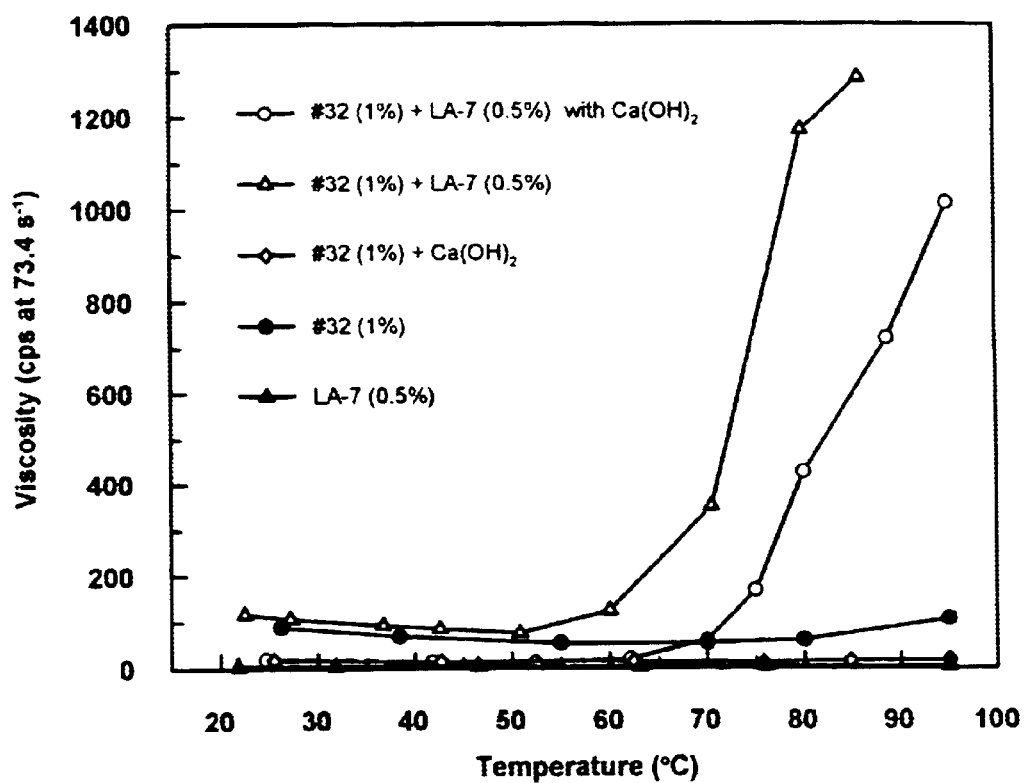

POLYMERS WHICH EXHIBIT
THERMOTHICKENING PROPERTIES AND
PROCESS MAKING SAME

IN THE CROSS-REFERENCE TO RELATED
APPLICATIONS

This application is a division of U.S. application Ser. No. 09/457,781 filed Dec. 9, 1999, now abandoned which, in turn, claims the benefit under 35 U.S.C. §119(e) of earlier filed and copending U.S. Provisional Application No. 60/112,306 filed Dec. 14, 1998, the contents of each of which are incorporated by reference herein.

BACKGROUND OF THE INVENTION

1. Field of the Invention

The present invention relates to polymers which exhibit thermothickening properties and the method for forming same. More specifically, the method comprises utilizing an inverse emulsion (i.e, water-in-oil) so that highly concentrated thermothickening polymer emulsions may be formed. The method can involve either the copolymerization of monomers containing multiple alkylene oxide groups or the grafting of alkylene oxide groups onto the chain of a polymer.

2. Technology Description

Reversible thermothickening polymers are known in the art. These polymers represent materials which, when distributed in a solvent, preferably water, increase in viscosity in response to temperature increases but once a certain temperature is reached, the viscosity of the solution will plateau and perhaps ultimately decrease with increasing temperature. The reversible effect comprises that cooling the thickened polymer will cause a reduction in the viscosity of the polymer solution. The goal in using such polymers in industrial applications is to have them exhibit a desired thickening profile at specified temperatures.

These polymers are typically hydrophobically modified water soluble polymers. They are essentially water-soluble (hydrophilic) polymers containing a small portion of hydrophobic groups usually in the form of pendant side chains or terminal end groups. In aqueous media, the hydrophobic groups present in these polymers associate, thus creating the unusual and desired theological properties. Typically these polymers consist of a water soluble polymer backbone modified with polymer grafts that exhibit a low critical solubility temperature (LCST). When subjected to temperature above this LCST the grafts associate and the resulting viscosity increases due these physical crosslinks.

Examples of references which disclose thermothickening polymers and their potential uses include the following documents. Hourdet et al., "Reversible Thermothickening of Aqueous Polymer Solutions", Polymer, Vol. 35, No. 12, 1994; Sarrazin-Cartalas et al. "Association and Thermal Gelation in Mixtures of Hydrophobically Modified Polyelectrolytes and Nonionic Surfactants, Langmuir, Vol. 10, No. 5, 1994; Loyen et al., "Reversible Thermal Gelation in Polymer/Surfactant Systems", Langmuir. Vol., 11. No. 4, 1995; Wang et al, "On the Thermal Gelling of Ethyl (hydroxyethyl)cellulose and Sodium Dodecyl Sulfate", Macromolecules, Vol. 30, No.1, 1997; Sigale et al., "Aspects of Crosslinking Sulfonated Polyacrylamides from Rheological Studies on Their Gels", CCC 0021-8995/97/061067-06, 1996; WO 97/00275; U.S. Pat. Nos. 4,722,962, 5,681,882 and 5,478,602. To the extent necessary for completion, these documents are expressly incorporated by reference.

In practice, the prior art has suggested the following method for synthesizing the polymers: conventional emulsion polymerization (i.e., oil-in-water emulsion), reverse phase polymerization (used in the production of responsive polymer beads), bulk polymerization, solution polymerization, and micellar polymerization. These synthesis methods are limited in that highly concentrated polymer solutions cannot be easily produced. Accordingly, it would be desirable to develop a synthesis method where high concentrations of thermothickening polymer solids resulting from a polymerization technique can be obtained.

It is further believed that polymers having a molecular weight of greater than 2,000,000 daltons (using a size exclusion chromatograhpy method) cannot be synthesized using the above-mentioned methods. Accordingly, it would desirable to produce polymers having a molecular weight greater than 2,000,000 daltons.

BRIEF SUMMARY OF THE INVENTION

In accordance the present invention, an improvement to the process for producing thermothickening polymers which overcomes the problems as discussed above, and provides novel products which can be used for multiple applications is provided. More specifically, the improvement comprises producing the thermothickening polymers by utilizing an inverse emulsion (water-in-oil) synthesis technique.

A first embodiment of the present invention comprises a method for producing a polymer which demonstrates thermothickening properties by polymerizing via water-in-oil emulsion polymerization one or more water soluble monomers with one or more polyalkoxylated monomers wherein said one or more polyalkoxylated monomers contains at least 25 alkylene oxide units; as well as the polymer produced thereby.

A second embodiment of the present invention comprises a method for producing a polymer which demonstrates thermothickening properties by polymerizing via water-in-oil emulsion polymerization one or more water soluble monomers and grafting alkylene oxide groups onto one or more moieties of said polymerized water soluble monomers, wherein said alkylene oxide groups contain at least 25 alkylene oxide units; as well as the polymer produced thereby.

The polymers according to the present invention can be used in any of the following applications: pharmaceutical compositions, oils, lubricants, paints and coatings, liquid cleansers, polishes, food products, waxes, cosmetic and personal care compositions, electrophoresis compositions, chromatography compositions, binding compositions, extrusion compositions, molding compositions, cementing compositions, controlled release compositions, or any other application where the thermothickening nature of the inventive compositions can be utilized.

An object of the present invention is to provide a method for producing thermothickening polymers using an inverse emulsion technique.

Still another object of the present invention is to provide novel thermothickening polymers.

A further object of the present invention is to provide novel end use compositions which possess thermothickening properties.

These, and other objects, will readily be apparent to those skilled in the art as reference is made to the drawings and the detailed description of the preferred embodiment.

BRIEF DESCRIPTION OF THE DRAWINGS

FIG. 1 represents the salt thickening of the polymer from Example #10 (1%).

FIG. 2 represents the thermal thickening of the polymer from Example #1 in water or in 15% $Na_2CO_3$.

FIG. 3 represents the thermal thickening of the polymer from Example #10 in saturated $Ca(OH)_2$ or in the presence of 15% (by weight) sodium carbonate.

FIG. 4 represents the thermal thickening of the polymer from Example #10 (1.0%) in the presence of 15% (by weight) $Na_2CO_3$ (prepared directly from emulsion or from the precipitated solid)

FIG. 5 represents the shear thickening of a 1% polymer from Example #10 (precipitated solid) in the presence of 20% (by weight) sodium carbonate.

FIG. 6 represents the thermal thickening of polymers from Examples #3–6 and #1 (0.5% by weight) in the presence of 15% (by weight) $Na_2CO_3$ (prepared from the precipitated solid with NaOH).

FIG. 7 represents the enhancement of thermal thickening of the polymer from Example #32 in the presence of Rhodasurf LA-7.

DETAILED DESCRIPTION OF THE PREFERRED EMBODIMENT

In describing the preferred embodiment, certain terminology will be utilized for the sake of clarity. Such terminology is intended to encompass the recited embodiment as well as all technical equivalents which operate in a similar manner for a similar purpose to achieve a similar result.

The present invention relates to the production of thermothickening polymers via the use of inverse (water-in-oil) emulsion techniques. The polymer is produced by either copolymerizing one or more water soluble monomers with a monomer containing at least 25 alkylene oxide units or by grafting at least 25 alkylene oxide units onto a polymer chain.

The first component is one or more water soluble monomers. These materials are generically defined as water soluble materials which possess ethylenic unsaturation and can be selected from the following classes of monomers:

(1) An ethylenically unsaturated carboxylic acid or acid salts having between about 3 and about 6 carbon atoms. Included in this class of compounds are acrylic acid, methacrylic acid, itaconic acid, maleic acid and fumaric acid and their acid salts (i.e., sodium, ammonium or potassium salts) and mixtures thereof.

(2) Acrylamide, alkyl substituted (alkyl represents an alkyl group having between 1 and about 6 carbon atoms) acrylamides such as methacrylamide, hydroxypropylacrylate. N,N-dimethylacrylamide, hydroxypropylmethacrylate, vinyl acetate and vinyl pyrollidone and mixtures thereof.

(3) An ethylenically unsaturated monomer containing one or more sulfonate or sulfoalkyl groups. Examples of component (c) include the acid (sodium, potassium or ammonium) salt of: 2-acrylamido-2-methylpropanesulfonic acid (AMPS), 1-allyloxy-2-hydroxy-propylsulfonic acid (AHPS), vinyl sulfonic acid, 2-sulfoethyl methacrylic acid, or vinyl benzene sulfonic acid and mixtures thereof. Particularly preferred is the sodium or ammonium salt of 2-acrylamido-2-methylpropanesulfonic acid (AMPS).

In particularly preferred embodiments, the water soluble monomers comprise a mixture of acrylic acid and AMPS, with the respective amounts being 0 to about 10 parts of acrylic acid per 100 parts AMPS by weight.

The second component comprises either a monomer which contains at least 25 alkylene oxide units or alkylene oxide units which are grafted onto the side and or end chains of the polymer resulting from the polymerization of the water soluble monomers.

The term alkylene oxide is expressly intended to include ethylene oxide, propylene, oxide and butylene oxide units, with mixtures of any of these units as specifically falling within the scope of the present invention. As a general rule, the preferred embodiments will include ethylene oxide and/or propylene oxide units. In addition, as a trend, increasing the number of ethylene oxide units will cause the thermothickening properties to be functional at higher temperatures whereas increasing the number of propylene oxide units will cause the thermothickening properties to be functional at lower temperatures. Accordingly, one skilled in the art should select the appropriate alkylene oxide(s) and in respective amounts to target the polymer to the right thermothickening temperature.

In a first embodiment, the hydrophobic alkylene oxide units are added to the water soluble monomer by selecting and copolymerizing an ethylenically unsaturated monomer containing at least 25 alkylene oxide units. Such monomers include alkoxylated fatty alcohols or ethylenically unsaturated materials (for example, vinyl compounds, acrylate compounds, acrylamide compounds, and the like) containing repeating glycol units. Examples of these materials include tridecyl alcohol having either (a) 50, 100 or 150 moles of ethylene oxide; (b) 75 moles of ethylene oxide and 25 moles of propylene oxide and capped with ethylene oxide; or (c) 45 moles each of ethylene oxide and propylene oxide and capped with ethylene oxide. Commercially available materials containing the level of alkoxylation desired include the Polyglycol materials sold by Clariant, the Ucon materials sold by Union Carbide, and the Pluronic materials sold by BASF.

In a second synthesis embodiment, the alkylene oxide units are added to the chain not as being part of an ethylenically unsaturated monomer having alkylene oxide units, but, rather, as directly adding (poly)ethylene oxide and/or (poly)propylene oxide to the water soluble monomers to graft the (poly)alkylene oxide units onto the polymerized water soluble monomer backbone.

The polymerization reaction takes place by utilizing inverse emulsion polymerization. The use of an inverse emulsion system is particularly preferred when it is necessary to produce an emulsion having high amounts of polymer solids. When forming a simple aqueous solution, the multicomponent reactants used to form the polymer tends to produce a solution having very high viscosities with a relatively low amount of polymer solids. Accordingly, for applications where higher levels of solids are needed (i.e., greater than 10 percent) the inverse emulsion polymerization technique should be utilized.

This technique is well documented; see, for instance CA 1304185 or U.S. Pat. No. 3,284,393. To the extent necessary for completion, these references are expressly incorporated by reference. A stable water-in-oil emulsion is composed of an aqueous phase and an organic phase. The aqueous phase comprises water, the water soluble monomer(s) and either the monomer containing alkylene oxide groups or the alkylene oxides. The pH of the aqueous phase is usually in the range of about 7 to about 9 and is preferably about 8 prior to mixing with the organic phase when using the first, copolymerization method, and about 1 to about 3, and preferably about 2 when the second, grafting method is used.

The organic phase comprises a hydrocarbon solvent and a water-in-oil emulsifier of low HLB value, preferably below 6. Any known hydrocarbon solvent may be used for this purpose but preferred hydrocarbon solvents are mineral spirits. For reasons of product safety, the mineral spirits should be of low aromatic content or free of aromatic content.

Suitable solvents include those aliphatic hydrocarbon solvents commercially available under the trademarks Isopar K and Isopar M from Esso and Shell Sol 715 and Shell Sol 150 or 160, from Shell. To reduce the volatile organic contents (VOC) associated with the use of organic solvents, solvents which have a high flash point/boiling point may be selected. Such solvents are sold by Witco under the trade designations PD-23 or PD-45. These materials are sold as "white mineral oils". Other oils include naturally occurring vegetable oils and oils sold by Pennzoil under the Drakeol trade name. Processing techniques such as solvent stripping and replacement may alternatively be used to reduce the VOC.

When producing the polymer by utilizing the water-in-oil polymerization technique, the amount of solvent that the aqueous phase is added to typically comprises between about 10 to 90 percent by weight of the entire composition, and more preferably between about 15 and about 25 percent by weight of the entire composition.

Suitable water-in-oil emulsifiers include those which have a HLB of less than 6. Examples include sorbitan esters of fatty acids and a preferred one is sorbitan monooleate, which has a HLB of 4.3. This emulsifier can be used alone or blended with one or more C12 to C15 alcohols ethoxylated with, on the average, three to four ethylene oxide molecules. Other suitable emulsifiers are available from Witco under the trademark Witcomide 511. It is believed that this compound contains approximately 50% unesterified N,N-diethanol fatty amide, the fatty groups present on the emulsifier chain containing approximately 64% oleyl, 33% linoleic and 3% palmityl groups. Approximately 40% by weight of the surfactant is believed to be the monoesterified variation of the compound, the ester group containing 15 to 22 carbon atoms. Additionally, small amounts of diesterified material are also present. Also considered within the scope of the present invention are the Hypermer surfactants sold by ICI.

The polymerization initiator may take the form of many known initiators such as azo, peroxide, persulfate, perester and redox initiators. The amount of initiator added to the solution typically ranges from between about 0.05 to about 2 weight percent of the emulsion with amounts ranging from about 0.1 to about 0.5 weight percent being particularly preferred. Free radical initiators which may be selected include peroxide materials such as benzoyl peroxide, cumene hydroperoxide, hydrogen peroxide, acetyl peroxide, lauroyl peroxide and persulfates, peresters such as t-butylperoxypivalate. α-cumylperoxypivalate and t-butylperoctoate, and azo (azobisnitrile) type initiators (water or oil soluble) such as 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-preferred is the use of perester and azo initiators, with α-cumylperoxypivalate and 2,2'-azobis-(2-methylypropanenitrile) being particularly preferred. The initiators may be added in an inert solvent such as mineral spirits, water or acetone.

To produce the novel polymer using inverse emulsion polymerization techniques a first aqueous phase is produced by adding the components from which the hydrophobically modified water soluble polymer is to be formed to water. The pH of this phase is typically between about 7 and about 9. If a chain transfer agent such as isopropyl alcohol is desired, it is typically added to this aqueous phase. The aqueous phase is added to an organic phase which includes the organic solvent and the low HLB surface active agent(s). The resulting mixture is then typically homogenized by the application of shear forces such that the particle size of the monomer emulsion is less than 500 microns. The polymerization initiator is added to the system by using one or more sequential additions. Polymerization takes place at ambient pressures and at a temperature between about 25 and about 45° C. under nitrogen purging. The reaction continues such that up to 99.9% of the monomers can be converted to a polymeric form.

For some applications, it may be ultimately desirable to invert the produced water-in-oil emulsion so that the aqueous phase is the continuous phase whereas the organic phase is the dispersed phase. Inversion of the water-in-oil emulsion may be accomplished by adding a surface active agent having a high HLB value. In practice, addition of a surfactant having a HLB of greater than or equal to 9 to a water-in-oil emulsion should adding a surface active agent having a high HLB value. In practice, addition of a surfactant having a HLB of greater than or equal to 9 to a water-in-oil emulsion should successfully effectuate inversion. Examples of surfactants which can effectively invert the emulsion include the following: nonylphenol ethoxylates (8–15 moles EO) and octylphenol ethoxylates (8–15 moles EO). Preferred is the use of nonylphenol ethoxylates having 9 moles of ethylene oxide.

The resulting polymer of the present invention has a molecular weight of greater than about 2,000,000 daltons. The achievement of such a high molecular weight is not believed to be obtainable by conventional polymerization methods, but only through use of the inventive method.

For still additional embodiments, once the polymer has been formed and either isolated from its medium or in an inverted (i.e., aqueous polymer emulsion) state, the thermothickening properties of the resulting polymer can be enhanced by the addition of one or more nonionic surfactants in relatively minor amounts, for example, between about 0.1 to about 10 parts per 100 parts by weight of polymer. Particularly preferred nonionic surfactants include fatty acid alcohol ethoxylates such as the chemical sold by Rhodia Inc. as Rhodasurf LA-3, LA-7 and LA-9 (lauryl alcohol ethoxylate (3, 7 or 9 moles ethylene oxide)) sorbiten monooleate, and Hypmer B246 available from ICI. Other potential groups of nonionic surfactants include, but are not limited to the following: aliphatic acid alkoxylates, higher aromatic alcohol alkoxylates, fatty acid amides of alkanolamines, fatty acid amide alkoxylates, propylene glycol alkoxylates, block or random copolymers of ethylene and propylene oxide, higher alcohol polyethylene polypropylene block or random adducts and mixtures thereof. A preferred amount of surfactant is from about 0.25 to about 1.5 weight percent based on the weight of the polymer. The thermothickening enhancement effect is also observed in the presence of high calcium ion concentration.

The resulting polymers, optionally containing property modifying surfactants, can be used in the following applications: pharmaceutical compositions, oils, lubricants, paints and coatings, liquid cleansers, polishes, food products, waxes, cosmetic and personal care compositions, electrophoresis compositions, chromatography compositions, binding compositions, extrusion compositions, molding compositions, cementing compositions, controlled release compositions, or any other application where the thermothickening nature of the inventive compositions can be utilized.

The invention is described in greater detail by the following non-limiting examples.

EXAMPLE 1

Into a first vessel, an aqueous phase is prepared containing 243.7 parts of distilled water (a), 160.0 parts of 2-acrylamido-2-methylpropanesulfonic acid (b) (AMPS from Lubrizol), 40.0 parts of acrylic acid (c), 66.7 parts of Polyglycol B11/700 (d) (from Hoechst) and 12.0 parts of 50% NaOH (e). This phase is formed by dissolving AMPS and acrylic acid in water, mixing in NaOH solution and then adding Polyglycol B11/700.

Into a second vessel, an oil phase is prepared by mixing 12.0 parts of sorbitan monooleate (f), 10.0 parts of C12–C15 alcohols ethoxylated with 3 moles of ethylene oxide (g) and 6.0 parts of Hypermer B246 (h) (commercially available from ICI) in 170.0 parts of mineral spirits Shell Sol 151 (i) (commercially available from Shell). The aqueous phase is poured slowly into the oil phase while mixing, and the resulting mixture is homogenized in a blender for 15–25 seconds. The obtained monomer emulsion is then transferred to a reaction vessel equipped with an agitator, a thermometer, a nitrogen inlet line, a feeding inlet line if required. The emulsion is purged with nitrogen for 1 hour before the reaction starts and maintained throughout the reaction. This monomer emulsion is then polymerized under constant agitation by using one of the following initiation methods:

Method 1. After purging with nitrogen for 1 hour, 0.010 part of ammonium persulfate in 1.0 part of water is added to the vessel and the contents are heated slowly to 35° C. and held at this temperature for 4 hours. Exothermic reaction is developed after about 10 minutes and will last about 1 hour. Slightly water cooling is applied at the earlier stage of the reaction. After 2 hours reaction, 0.025 part of ammonium persulfate in 3 parts of water is fed into the reaction over 30 minutes. The emulsion becomes more translucent after 4 hours reaction. At this stage, the temperature is increased to 40–43° C. and the mixture is maintained at this temperature for another 2 hours, during which 0.120 part of ammonium iron (II) sulfate hexahydrate in 2 parts of water is fed to the reaction vessel over half an hour after 1 hour at 40–43° C., followed by 0.025 part of ammonium persulfate in 2 parts of water over half an hour.

Method 2. The emulsion is heated to 40° C. for an automatic reaction after purging with nitrogen for 1 hour. Exothermic reaction is developed within half an hour at 40° C. After 2.5 hours reaction, 0.025 parts of ammonium persulfate in 3 parts of water is fed into the reaction vessel over 45 minutes and then 0.120 parts of ammonium iron (II) persulfate in 3 parts of water is fed in the vessel over 40 minutes, followed by 0.025 parts of ammonium persulfate in 3 parts of water over half an hour. After all the initiator is added, the contents are held at 40° C. for another half hour and then cooled to room temperature.

Method 3. After the monomer emulsion is purged with nitrogen for 1 hour, 0.10 part of ammonium persulfate in 1 part of water is added to the vessel and then heated to 35° C. and maintain at this temperature for 4 hours, and then at 41° C. for another hour after addition of 0.050 part of ammonium persulfate in 1 part of water. At this stage, 0.120 part of ammonium iron (II) sulfate hexahydrate in 1 parts of water is added to the reaction, followed by 0.025 part of ammonium persulfate in 1 part of water. The reaction contents are held at 41° C. for another half an hour then stopped. Alternatively, the reaction temperature is also controlled at 45, 50 and 55° C.

Method 4. After 1 hour of nitrogen purging, 0.020 part of ammonium persulfate in 1 part of water is added to the emulsion and the contents of the vessel are maintained at 25° C. and the cooling is in place. One tenth of 0.120 parts of ammonium iron (II) sulfate hexahydrate in 5 parts of water is fed to the reaction vessel to start the reaction. Exothermic reaction occurs after about 5 minutes and the reaction temperature is controlled at 25–33° C. by water cooling. The rest of the ammonium iron (II) sulfate hexahydrate solution is fed to the reaction in such a way that the temperature can be kept below 33° C. by cooling. After half an hour when the exotherm is becoming smaller, 0.025 part of ammonium persulfate in 1 part of water is added into the vessel. The feeding rate of ammonium iron (II) sulfate hexahydrate is adjusted so the solution is all added to the reaction vessel in about one hour. The reaction vessel is warmed to 40° C. for an additional hour. Alternatively, ammonium iron (II) sulfate hexahydrate is replaced with ascorbic acid (0.058 part).

Method 5. The contents in the vessel are heated to 37° C. after purging with nitrogen for 1 hour and maintained at this temperature throughout the reaction. 0.20 parts of Trigonox 99-C75 (75% cumyl peroxylneodecanoate) is added to the reaction mixture three times for every 1.5 hour. The reaction is carried out at 37° C. for 5 hours then stopped.

EXAMPLES 2–6

In Example #2, Lubricant 50-HB-5100 from Union Carbide is replaced with Polyglycol B11/700, while in Example #3–6, Lubricant 50-HB-3520 partially replaces Polyglycol B11/700. The actually amounts of Polyglycol in Examples #3–6 are listed in Table 1 with the amounts being in parts by weight. The other components in these examples are those in Example #1. Polymerization method 2 is applied for the synthesis of the polymer emulsions.

EXAMPLES 7–34

Emulsions are prepared in the same manner as Example #1 with various compositions of (a) to (h) components. These monomer emulsions are then polymerized by using the method(s) specified. These examples are listed in Table 2, with the amounts being in parts by weight and polymerization method(s) in the last column.

EXAMPLES 35–39

Into a reaction vessel, equipped with an agitator, a condenser, a gas inlet, are added 150.0 parts of tridecyl alcohol randomly ethoxylated with 50 mol of ethylene oxide and 50 mol of propylene oxide, 0.070 parts of p-methoxyphenol and 4.54 parts of methacrylic anhydride. The contents are heated at 75–80° C. for 4 hours while purged with air. After the reaction mixture is cooled to 60° C., 154.0 parts of distilled water is added and reaction is stopped. Other type of poly(ethylene oxide) or its co-polymer with propylene oxide is also methacrylated with this method including Polyglycol B11/700, tridecyl alcohol ethoxylated with 75 ethylene oxide and 25 propylene oxide.

The monomer emulsion is prepared as described in Example #1 by using the polyglycol (d) prepared above while the amount of other components are listed in Table 2. The pH of the aqueous phase is adjusted to 7–8 with sodium hydroxide. The polymerization is carried out by using Method 5 for 5 hours at 37–40° C. Triganox 99 C-75 is added for every hour of reaction. Polymer sample is isolated by adding the emulsion to excess of acetone.

EXAMPLES 40–45

Into a reaction vessel is added 556.0 parts of butyl alcohol randomly ethoxylated with 50 mols of ethylene oxide and 50 propylene oxide (ethylene oxide capped) and 23.1 parts of 25% sodium methylate in methanol. The contents are then heated at 95–100° C. under vacuum for 3 hours and then cooled to room temperature. The reaction vessel is then equipped with an agitator. To the above mixture, 17.8 parts of vinylbenzylchloride (inhibited with 1000 ppm phenothiazine) is added while stirring. The contents are then sealed under agitation overnight. The product so obtained is then mixed with 0.2 parts of p-methoxylphenol, saturated with air and stored at room temperature.

The monomer emulsion is prepared as described in Example #1 by using the polyglycol (d) prepared above, Hypermer B261 (h) rather than B246 is used to prepare the oil phase, while the amount of other components are listed in Table 2. The pH of the aqueous phase is adjusted to 7–8 with sodium hydroxide. Method 2 is used for polymerization. The reaction is carried out at 41° C. for 2 hours after 0.50 parts of Triganox 99 C-75 is added and then at 55° C. for 1 hour with additional 0.30 parts of Triganox 99 C-75. Polymer sample is isolated by adding the emulsion to excess of acetone or ethanol.

EXAMPLE 46

This example describes the isolation of the polymer from the emulsion of Examples #1–34.

Isolation by $Na_2CO_3$. 400 parts of emulsion from Example #22 are diluted with 100 parts of mineral spirits. To this stirring emulsion is added is 100 parts of sodium carbonate to yield a slurry (sometimes micro-beads). The mineral spirits are then squeezed out through a 75 micron nylon filter bag. The non-tacky semi-solid is dried in vacuum at 60–100° C. overnight to yield 430 parts of solid product. Alternatively, $Na_2CO_3$ is replaced with 50% NaOH to neutralize and to precipitate the polymer. The isolation is also done without further dilution with mineral spirits. The amount of $Na_2CO_3$ is used, at least, to neutralize the emulsion stoichiometrically or up to 50% in excess.

EXAMPLE 47

This example describe the characterization of thermothickening properties of the polymers thus made.

The thickening properties of the polymer are characterized by measuring the viscosity against salt concentration (salt thickening), temperature (thermal thickening) or shear rate (shear thickening). Polymer solution is either prepared with the above isolated solid product or with the inverted emulsion by nonyl phenol ethoxylated with 9 mols of ethylene oxide. The inversion of the emulsion is done by mixing 10.0 parts of the emulsion with 0.50 parts of nonyl phenol ethoxylated with 9 mol of ethylene oxide. The mixture is then diluted with 40.0 parts of water and neutralized with 1.14 parts of 50% (by weight) sodium hydroxide. This solution is then used for thickening characterization.

Sodium carbonate is used as the salt to show salt thickening. An 1.0% polymer solution is prepared either by diluting inverted emulsion or by dissolving the isolated solid in water. The viscosity is recorded either by its own or after each addition of the specific amount of sodium carbonate. The salt thickening profiles are shown in FIG. 1.

The thermothickening of the polymer solution is measured by recording the viscosity profile versus the temperature. A 2.0% polymer in water or in saturated $Ca(OH)_2$ solution is prepared by dissolving 2 parts of polymer in 98 parts of saturated $Ca(OH)_2$ and the viscosity versus temperature is recorded on a Farm 50 rheometer at a shear rate of 170 $s^{-1}$ (FIGS. 2–3). Alternatively, 0.5–1% polymer in 15% $Na_2CO_3$ solution is prepared by dissolving or diluting 0.5–1.0 parts (active polymer) in 85 parts of distilled water and then 15 parts of $Na_2CO_3$ is dissolved in the solution. The viscosity profiles versus temperature (FIGS. 2–4, 6) are recorded on a Brookfield LV viscometer at 30 rpm (36.7 $s^{-1}$).

Shear thickening is measured on a Brookfield Programmable Rheometer with spindle CP51. The polymer solution (1% from precipitated solid) containing 20% (by weight) sodium carbonate is prepared, the viscosity against shear rate is recorded (FIG. 6).

EXAMPLE 48

This example demonstrates that the non-ionic surfactants enhance the thermothickening of the polymer synthesized in Examples #1–45.

Polymer solution (0.5–1% by weight) is prepared by dissolving the isolated polymer in distilled water. To this solution is mixed in nonionic surfactant (0–2% by weight of Rhodasurf LA-7). If required, $Ca(OH)_2$ is added to saturate the solution. The solution is heated and its viscosity at different temperature is recorded on a Brookfield LV viscometer at 60 rpm (shear rate 76.3 $s^{-1}$). Polymers from Examples #1, #21, #32 (polymerized at 45, 55° C.), #34 (polymerized at 40° C.), #39 and #43 are tested with one or more of the nonionic surfactants, which are C12–15 alcohols ethoxylated with 3, 7 or 9 mols of ethylene oxide (an example of a representative surfactant having 7 mols of ethylene oxide is shown in FIG. 7).

TABLE 1

| Example | Lubricant 50-HB-3520 (MW 3520) | Polyglycol B11/700 (MW 5000) |
| --- | --- | --- |
| 3 | 20.0 | 40.0 |
| 4 | 30.0 | 30.0 |
| 5 | 40.0 | 20.0 |
| 6 | 60.0 | — |

TABLE 2

| Example # | Amount of Components (Parts by Weight) | | | | | | | | | | Polymerization Method # |
| --- | --- | --- | --- | --- | --- | --- | --- | --- | --- | --- | --- |
| | a | b | c | d | e | f | g | h | i | j | |
| 7 | 233.3 | 160.0 | 40.0 | 66.7 | — | 12.8 | 12.5 | 6.0 | 214.3 | 4.5 | 4 and 5 |
| 8 | 249.9 | 171.4 | 42.9 | 71.5 | — | 10.9 | 10.7 | 5.1 | 183.6 | 3.9 | 4, $(NH_4)_2Fe(SO_4)_2$ |
| 9 | 249.9 | 171.4 | 42.9 | 71.8 | — | 10.9 | 10.7 | 5.1 | 183.6 | — | 4, $(NH_4)_2Fe(SO_4)_2$ |

TABLE 2-continued

| Example # | Amount of Components (Parts by Weight) | | | | | | | | | Polymerization Method # |
|---|---|---|---|---|---|---|---|---|---|---|
| | a | b | c | d | e | f | g | h | i | j |
| 10 | 245.0 | 160.0 | 40.0 | 66.7 | 5.0 | 12.0 | 10.0 | 6.0 | 170.0 | — 4, (NH$_4$)$_2$Fe(SO$_4$)$_2$ |
| 11 | 296.0 | 120.0 | 30.0 | 50.0 | 4.0 | 12.0 | 10.0 | 6.0 | 170.0 | — 4, (NH$_4$)$_2$Fe(SO$_4$)$_2$ |
| 12 | 225.0 | 160.0 | 40.0 | 66.7 | 20.0 | 12.0 | 10.0 | 6.0 | 170.0 | — 4, (NH$_4$)$_2$Fe(SO$_4$)$_2$ |
| 13 | 284.0 | 120.0 | 30.0 | 50.0 | 16.0 | 12.0 | 10.0 | 6.0 | 170.0 | — 4, (NH$_4$)$_2$Fe(SO$_4$)$_2$ |
| 14 | 215.0 | 160.0 | 40.0 | 66.7 | 30.0 | 12.0 | 10.0 | 6.0 | 170.0 | — 4, (NH$_4$)$_2$Fe(SO$_4$)$_2$ |
| 15 | 250.0 | 160.0 | 40.0 | 66.7 | — | 12.0 | 10.0 | 6.0 | 170.0 | — 2 and 4 |
| 16 | 268.0 | 144.0 | 36.0 | 60.0 | — | 12.0 | 10.0 | 6.0 | 170.0 | — 2 |
| 17 | 268.0 | 160.0 | 40.0 | 66.7 | 12.7 | 12.0 | 10.0 | 6.0 | 170.0 | — 2 |
| 18 | 243.7 | 176.0 | 24.0 | 66.7 | 12.7 | 12.0 | 10.0 | 6.0 | 170.0 | — 1 |
| 19 | 243.7 | 190.0 | 10.0 | 66.7 | 12.7 | 12.0 | 10.0 | 6.0 | 170.0 | — 1 |
| 20 | 243.7 | 184.0 | 16.0 | 66.7 | 12.7 | 12.0 | 10.0 | 6.0 | 170.0 | — 1 |
| 21 | 243.7 | 200.0 | — | 66.7 | 12.7 | 12.0 | 10.0 | 6.0 | 170.0 | — 1 |
| 22 | 241.4 | 200.0 | — | 66.7 | — | 12.0 | 10.0 | 6.0 | 170.0 | — 1 |
| 23 | 150.0 | 200.0 | — | 66.7 | 8.0 | 12.0 | 10.0 | 6.1 | 151.7 | — 3, (35° C.) |
| 24 | 265.0 | 200.0 | | 50.0 | 8.0 | 12.0 | 10.0 | 6.0 | 170.0 | 3 (35° C.) |
| 25 | 243.7 | 200.0 | | 66.7 | 12.0 | 15.0 | 12.5 | 7.5 | 163.0 | 3, (35° C.) |
| 26 | 243.7 | 200.0 | | 66.7 | 12.0 | 18.0 | 15.0 | 9.0 | 156.0 | 3, (35° C.) |
| 27 | 313.4 | 150.0 | — | 50.0 | 9.0 | 12.0 | 10.0 | 6.0 | 170.0 | — 3, (35° C.) |
| 28 | 150.0 | 200.0 | — | 66.7 | 12.0 | 12.0 | 10.0 | 6.0 | 170.0 | — 3, (35° C.) |
| 29 | 265.0 | 200.0 | — | 50.0 | 8.0 | 12.0 | 10.0 | 6.0 | 170.0 | — 3, (35° C.) |
| 30 | 280.0 | 200.0 | — | 35.0 | 8.0 | 12.0 | 10.0 | 6.0 | 170.0 | — 3, (35° C.) |
| 31 | 243.7 | 200.0 | — | 66.7 | 12.0 | 36.0 | 30.0 | 18.0 | 160.0 | — 3, (35° C.) |
| 32 | 150.0 | 200.0 | — | 35.0 | 8.0 | 12.0 | 10.0 | 6.0 | 170.0 | — 3 (35, 45 and 55° C.) |
| 33 | 243.7 | 200.0 | — | 66.7 | 12.0 | 18.0 | 15.0 | 9.5 | 156.0 | — 3 (45° C.), |
| 34 | 150.0 | 160.0 | 40.0 | 45.0 | 12.0 | 12.0 | 10.0 | 6.0 | 170.0 | — 3, (40 and 50° C.) |
| 35 | 317.0 | 37.0 | 86.3 | 24.7 | 109.4 | 30.0 | 15.0 | — | 250.0 | 8.0 5 |
| 36 | 336.1 | 32.7 | 76.5 | 32.8 | 95.1 | 30.0 | 15.0 | — | 250.0 | 8.0 5 |
| 37 | 312.0 | — | 120.0 | 12.0 | 130.0 | 30.0 | 15.0 | — | 250.0 | 8.0 5 |
| 38 | 376.0 | 92.0 | 23.0 | 23.0 | 61.3 | 30.0 | 15.0 | — | 250.0 | 8.0 5 |
| 39 | 381.8 | 92.0 | 23.0 | 28.8 | 61.3 | 30.0 | 15.0 | — | 250.0 | 8.0 5 (41° C.) |
| 40 | 130.0 | 200.0 | | 66.7 | 77.0 | 22.0 | 5.5 | 5.5 | 157.0 | — 5 (41° C.) |
| 41 | 130.0 | 200.0 | — | 50.0 | 77.0 | 20.0 | 5.0 | 5.0 | 160.0 | — 5, (41° C.) |
| 42 | 130.0 | 100.0 | 25.0 | 31.2 | 65.0 | 15.0 | 4.0 | 4.0 | 138.0 | — 5, (41° C.) |
| 43 | 130.0 | 200.0 | — | 33.3 | 77.0 | 22.0 | 5.5 | 5.5 | 160.0 | — 5, (41° C.) |
| 44 | 122.0 | 204.0 | — | 51.0 | 78.4 | 21.0 | 5.3 | 5.3 | 200.0 | — 5, (41° C.) |
| 45 | 130.0 | 200.0 | — | 50.0 | 77.0 | 22.0 | 5.5 | 5.5 | 190.0 | 5, (41° C.) |

Having described the invention in detail and by reference to the preferred embodiments thereof, it will be apparent that modifications and variations are possible without departing from the scope of the appended claims.

What is claimed is:

1. A method for producing a polymer which demonstrates thermothickening properties by polymerizing via water-in-oil emulsion polymerization one or more water soluble monomers with one or more polyalkoxylated monomers wherein said one or more polyalkoxylated monomers contains at least 25 alkylene oxide units.

2. The method of claim 1 wherein a thermothickening enhancing effective amount of a nonionic surfactant is added to the polymer.

* * * * *